United States Patent
Tamai et al.

(10) Patent No.: US 8,678,532 B2
(45) Date of Patent: Mar. 25, 2014

(54) PRINTING PROCESS OF FORMING TWO IMAGES ON PRINTING MEDIUM IN OVERLAPPING MANNER

(75) Inventors: Takashi Tamai, Shiojiri (JP); Takeshi Tanoue, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 152 days.

(21) Appl. No.: 13/047,121

(22) Filed: Mar. 14, 2011

(65) Prior Publication Data

US 2011/0221810 A1    Sep. 15, 2011

(30) Foreign Application Priority Data

Mar. 12, 2010  (JP) ................. 2010-055425

(51) Int. Cl.
*B41J 29/38* (2006.01)
(52) U.S. Cl.
USPC .................... 347/12; 347/9; 347/14
(58) Field of Classification Search
USPC .................................. 347/9, 12, 14
See application file for complete search history.

(56) References Cited

U.S. PATENT DOCUMENTS

| | | | |
|---|---|---|---|
| 6,789,867 B2 | 9/2004 | Takahashi et al. | |
| 7,407,277 B2 | 8/2008 | Yoneyama | |
| 2001/0006392 A1 | 7/2001 | Otsuki | |
| 2002/0063749 A1 | 5/2002 | Kanda et al. | |
| 2003/0112284 A1 | 6/2003 | Otsuki | |
| 2004/0130595 A1 | 7/2004 | Thiessen et al. | |
| 2004/0160478 A1 | 8/2004 | Weijkamp et al. | |
| 2004/0252160 A1 | 12/2004 | Iwasaki et al. | |
| 2005/0134642 A1 | 6/2005 | Morikawa et al. | |
| 2006/0158481 A1* | 7/2006 | Spevak et al. | 347/43 |
| 2007/0279470 A1 | 12/2007 | Arai | |
| 2009/0244137 A1 | 10/2009 | Kakutani | |
| 2010/0053247 A1 | 3/2010 | Kakutani | |
| 2011/0221811 A1 | 9/2011 | Tamai et al. | |

FOREIGN PATENT DOCUMENTS

| | | |
|---|---|---|
| CN | 101659149 A | 3/2010 |
| JP | 2001162841 A | 6/2001 |
| JP | 2002-307672 A | 10/2002 |
| JP | 2004-306591 A | 11/2004 |
| JP | 2005-144749 A | 6/2005 |

* cited by examiner

*Primary Examiner* — Jason Uhlenhake
(74) *Attorney, Agent, or Firm* — Nutter McClennen & Fish LLP; John J. Penny, Jr.; Christina M. Sperry

(57) ABSTRACT

A printing apparatus includes a controller forming an image on a printing-medium by repeating an image-forming-operation of allowing a plurality of nozzle-columns to be moved and allowing the plurality of nozzle-columns to eject ink and a transporting-operations of allowing the printing-medium to be transported. The controller forms a first-image by an image-forming-operation where the moving-direction of a nozzle-column is one direction in a second direction by using a first-image-nozzle-group configured with the nozzles included in the first-nozzle-column. In addition, the controller forms a second-image which is overlapped with the first-image by an image-forming-operation where the moving-direction of a nozzle-column is one direction and by an image-forming-operation where the moving-direction of the nozzle-column is the direction opposite to the one direction by using a second-image-nozzle-group configured with the nozzles of which positions in the first direction are different from those of the first-image-nozzle-group among the nozzles included in the second-nozzle-column.

12 Claims, 12 Drawing Sheets

WHITE-COLOR PRINT (W-C PRINT)

COLOR-WHITE PRINT (C-W PRINT)

FIRST EMBODIMENT
MODE A10 (IMAGE QUALITY PRECEDENCE)

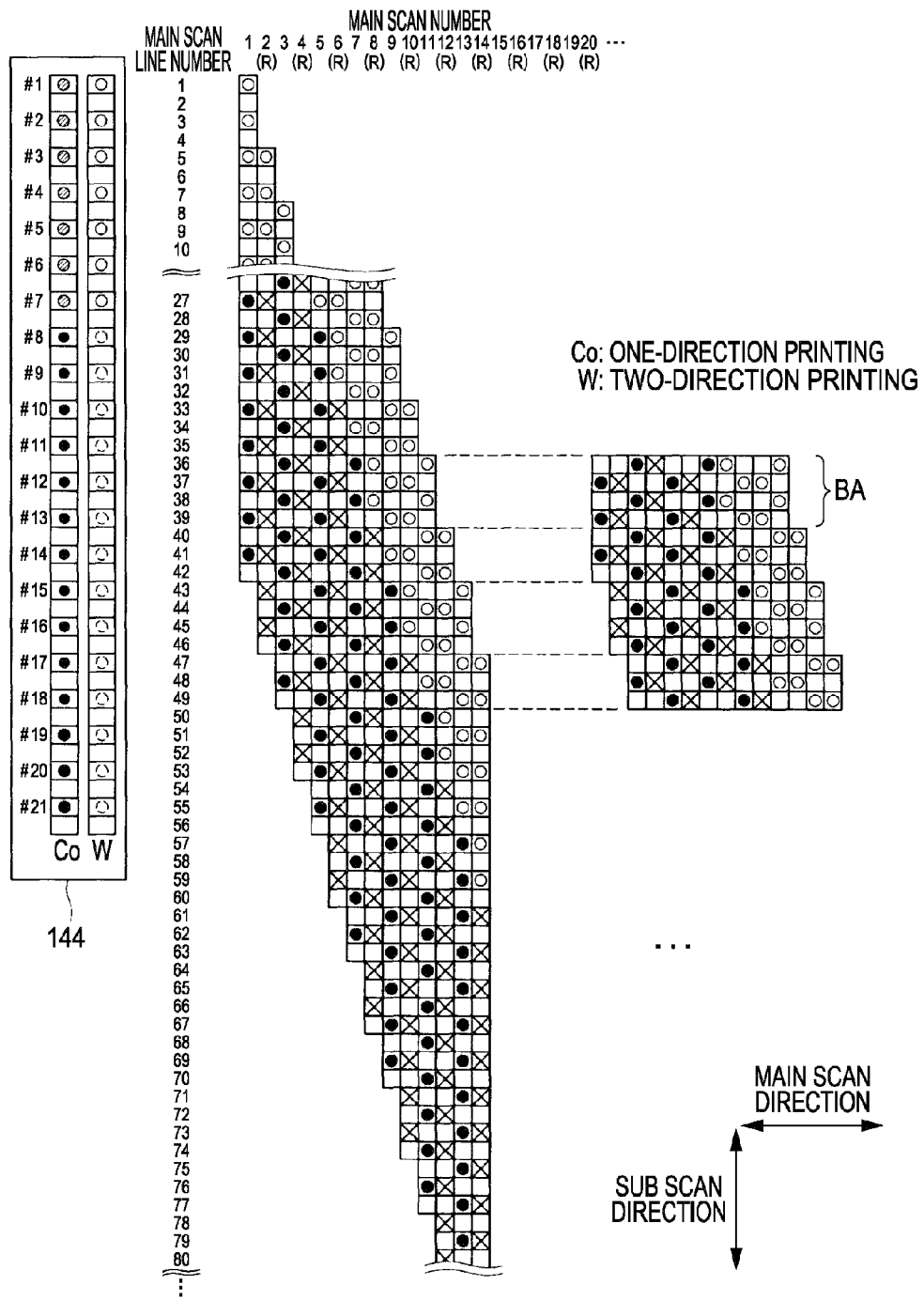

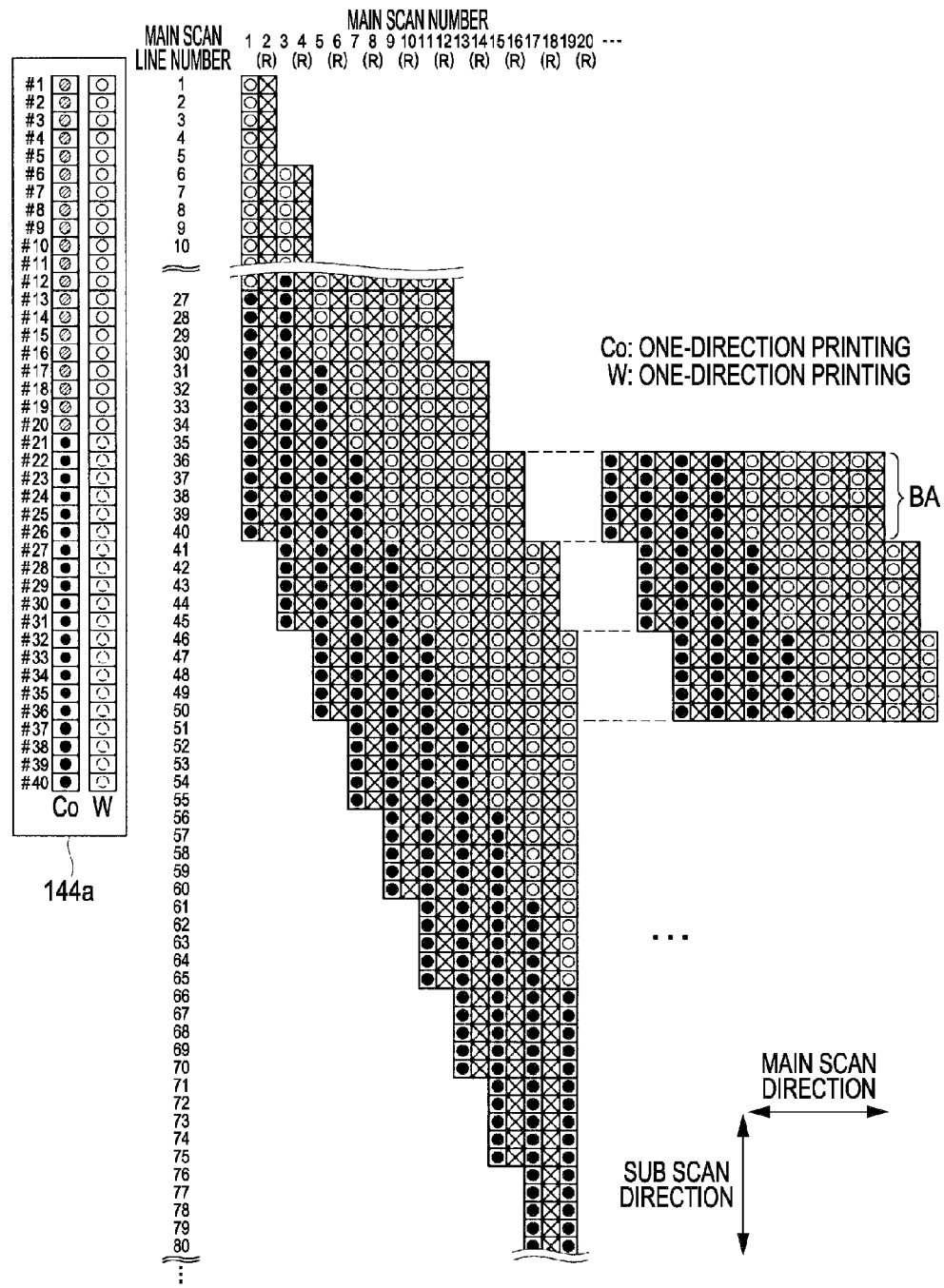

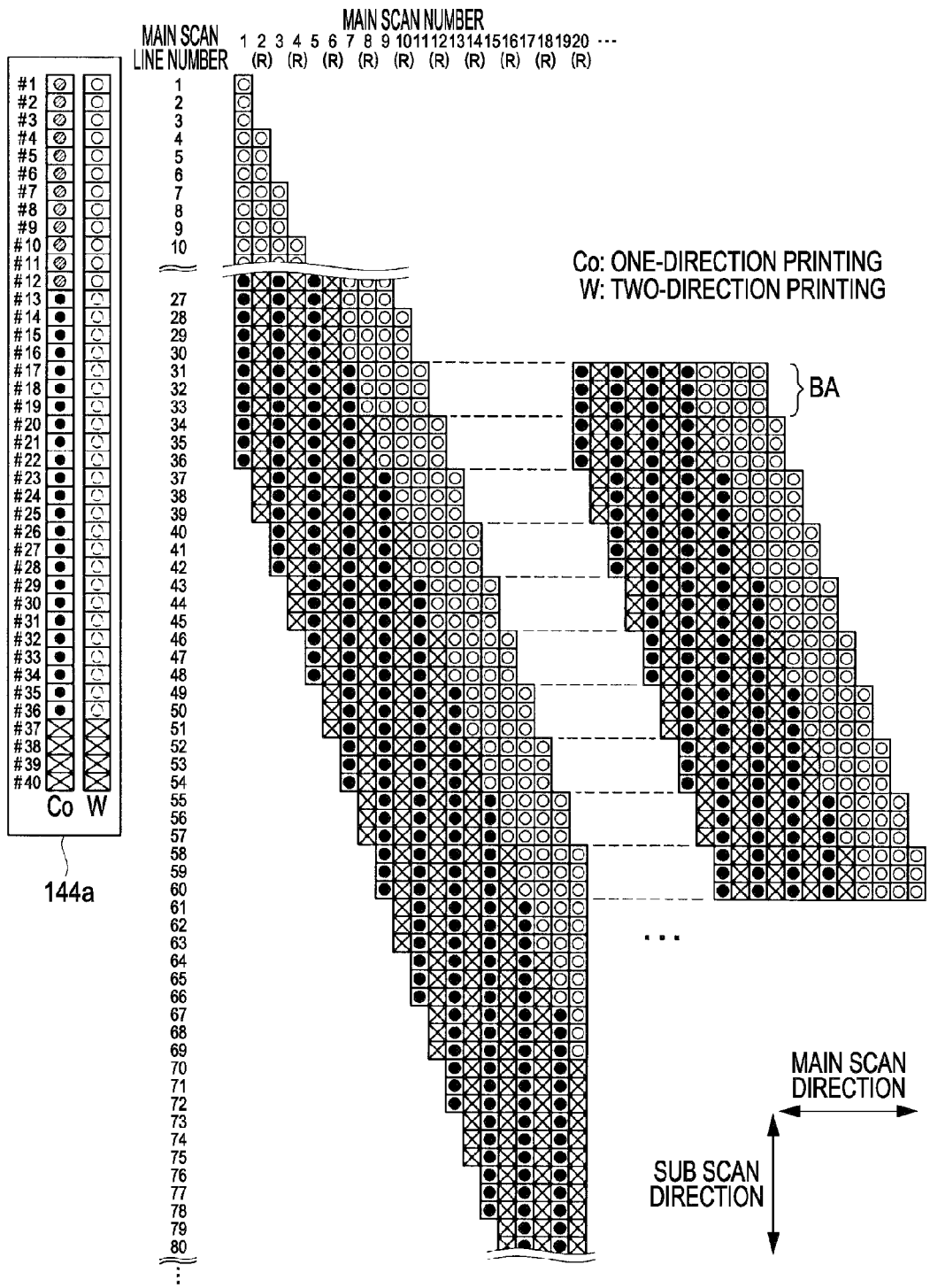

PRINTING PROCESS OF FORMING TWO IMAGES ON PRINTING MEDIUM IN OVERLAPPING MANNER

BACKGROUND

1. Technical Field

The present invention relates to a printing process of forming two images on a printing medium in an overlapping manner.

2. Related Art

There is disclosed a printing apparatus including an image-recording head which ejects image-recording ink for mainly recording an image and an supplementary recording head which is disposed at the upstream side and/or the downstream side of the image-recording head in the sub scan direction to eject a supplementary recording ink for supplementing the recording of image such as background ink or transparent ink (for example, refer to JP-A-2005-144749). The printing apparatus may be able to form two images (for example, a white background image and a color image) on a printing medium (for example, a transparent film) in an overlapping manner. JP-A-2002-307672 is an example of the related art.

In the printing apparatus in the related art, in addition to the image-recording head, since the supplementary recording head disposed at the upstream side and/or the downstream side in the sub scan direction is provided, there is a problem in that an apparatus for performing the printing process of forming the two images on the printing medium in an overlapping manner is increased in size.

On the other hand, if the printing process of forming the two images on the printing medium in an overlapping manner is to be performed, there is a case where image qualities required for the two images are different from each other according to the use or the purpose. Therefore, it is preferable to possibly implement a suitable printing process such as a printing process of image quality precedence for the one specific image according to use or purpose.

SUMMARY

An advantage of some aspects of the invention is to implement a suitable printing process according to use or purpose while suppressing an increase in a size of the apparatus when the printing process of forming two images on a printing medium in an overlapping manner is performed.

The invention may be implemented as the following aspects or application examples.

Application Example 1

There is provided a printing apparatus including: a plurality of nozzle columns each of which is configured with a plurality of nozzles which are aligned in a first direction to eject ink, the plurality of nozzle columns corresponding to different ink and being aligned in a second direction intersecting the first direction; a moving mechanism relatively moving the plurality of nozzle columns in the second direction with respect to a printing medium; a transporting mechanism relatively transporting the printing medium in the first direction with respect to the plurality of nozzle columns; and a controller forming an image on the printing medium by repeating an image forming operation of allowing the moving mechanism to move the plurality of nozzle columns and allowing the plurality of nozzle columns to eject ink and a transporting operation of allowing the transporting mechanism to transport the printing medium, wherein the controller forms a first image by the image forming operation where the moving direction of the plurality of nozzle columns is one direction in the second direction by using a first image nozzle group configured with the plurality of nozzles included in the plurality of nozzle columns and forms a second image of which at least a portion is overlapped with the first image on the printing medium by the image forming operation where the moving direction of the plurality of nozzle columns is the one direction and the image forming operation wherein the moving direction of the plurality of nozzle columns is the direction opposite to the one direction by using a second image nozzle group configured with the plurality of nozzles of which the positions in the first direction are different from those of the first image nozzle group.

In the printing apparatus, since the position of the first image nozzle group used for forming the first image and the position of the second image nozzle group used for forming the second image of which at least a portion is overlapped with the first image in the first direction are different from each other, it is possible to implement the printing process of simultaneously forming the first image and the second image without providing the nozzle column for forming the second image at the first direction upstream side and/or downstream side of the nozzle column for forming the first image. In addition, in the printing apparatus, since the image is formed by the bi-directional image forming operations in the one direction and the opposite direction with respect to the second image and the image is formed by only the image forming operation in the one direction with respect to the first image, it is possible to improve a printing speed while suppressing a deterioration in an image quality of the first image. In this manner, in the printing apparatus, it is possible to perform image forming by a method according to characteristics of two images. Therefore, in the printing apparatus, it is possible to implement a suitable printing process according to use or purpose while suppressing an increase in a size of the apparatus when the printing process of forming two images on a printing medium in an overlapping manner is performed. In addition, in the case where the movement of the plurality of nozzle columns in the one direction in the second direction is set to a forward pass in the second direction, the movement of the plurality of nozzle columns in the direction opposite to the one direction may be set to a backward pass in the second direction. In addition, the forward pass and the backward pass may be reverse to each other.

Application Example 2

There is provided the printing apparatus according to Application Example 1, wherein the number of nozzles constituting the first image nozzle group is larger than the number of nozzles constituting the second image nozzle group.

In the printing apparatus, by forming the second image by the bi-directional image forming operations in the one direction and the opposite direction and by forming the first image by the image forming operation in the one direction, it is possible to reduce a printing time.

Application Example 3

There is provided the printing apparatus according to Application Example 2, wherein the number of nozzles constituting the first image nozzle group is twice the number of nozzles constituting the second image nozzle group.

In the printing apparatus, by forming the second image by the bi-directional image forming operations in the one direction and the opposite direction and by forming the first image by the image forming operation in the one direction, it is possible to reduce the printing time as much as possible.

Application Example 4

There is provided the printing apparatus according to any one of Application Examples 1 to 3, wherein the controller performs forming of the first image and the second image in a printing mode of forming the first image by the image forming operation where the moving direction of the plurality of nozzle columns is the one direction by using the first image nozzle group and forming the second image by the image forming operation where the moving direction of the plurality of nozzle columns is the one direction and the image forming operation where the moving direction of the plurality of nozzle columns is the opposite direction by using the second image nozzle group and in a printing mode of forming the first image by the image forming operation where the moving direction of the plurality of nozzle columns is the one direction by using the first image nozzle group and forming the second image by the image forming operation where the moving direction of the plurality of nozzle columns is the one direction by using the second image nozzle group which is configured with the nozzles of which the number is equal to the number of nozzles constituting the first image nozzle group.

In the printing apparatus, since it is possible to form an image in a plurality of printing modes of which the printing time and the image quality of the second image are different from each other, it is possible to implement a suitable printing process according to the use or the purpose such as a printing process of preferring a reduction of the printing time or a printing process of preferring securing the image quality of the second image.

Application Example 5

There is provided the printing apparatus according to Application Example 1, wherein the controller acquires dot data indicating to-be-formed ink dots corresponding to each of two images, performs forming of the first image by using the first image nozzle group based on the dot data for the image where the number of to-be-formed ink dots is larger, and performs forming of the second image by using the second image nozzle group based on the dot data for the image where the number of to-be-formed ink dots is smaller.

In the printing apparatus, by forming the image where the number of to-be-formed ink dots is smaller by the bi-directional image forming operation in the one direction and the opposite direction, it is possible to reduce the printing time while suppressing the deterioration of the overall image quality of image, so that it is possible to implement a suitable printing process according to the use or the purpose.

Application Example 6

There is provided the printing apparatus according to Application Example 1, wherein the controller forms the second image by using the second image nozzle group and a nozzle group among the nozzles included in the first nozzle column, of which the position in the first direction is the same as that of the second image nozzle group.

In the printing apparatus, since it is possible to form the second image by using the nozzle groups included in the second nozzle column and the nozzle groups included in the first nozzle column, it is possible to implement a suitable printing process according to the use or the purpose while suppressing an increase in a size of the apparatus when a printing process of forming two images in an overlapping manner is performed with respect to various types of two images.

In addition, the invention may be implemented in various aspects. For example, the invention may be implemented in form of a printing method and a printing apparatus, a printing apparatus control method and a printing apparatus control device, a printing system, methods thereof, a computer program for implementing function of an apparatus or a system, a recording medium of recording the computer program, a data signal implemented in a carrier wave including the computer program.

BRIEF DESCRIPTION OF THE DRAWINGS

The invention will be described with reference to the accompanying drawings, wherein like numbers reference like elements.

FIG. 10 is a diagram illustrating a printing method in each printing mode of the first embodiment.

FIG. 11 is a diagram illustrating a printing method in each printing mode of a second embodiment.

FIG. 12 is a diagram illustrating a printing method in each printing mode of the second embodiment.

DESCRIPTION OF EXEMPLARY EMBODIMENTS

Hereinafter, embodiments of the invention will be described based on exemplary embodiments in the following order.

Figure 1:
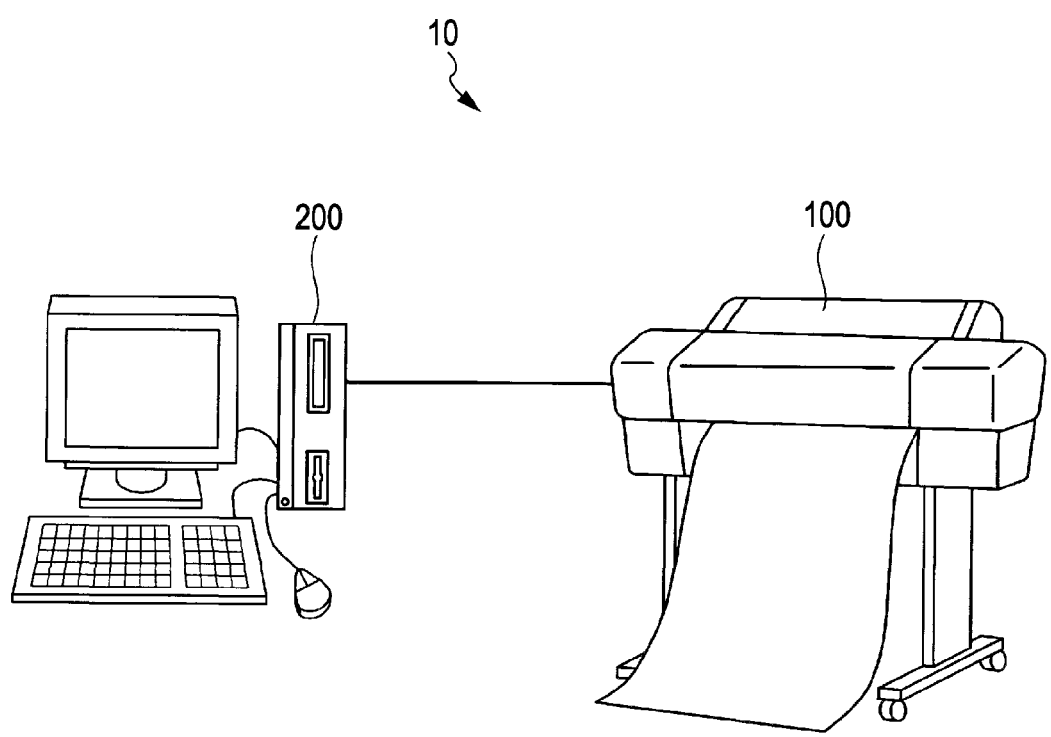
FIG. 1 is a schematic diagram illustrating a configuration of a printing system according to a first embodiment of the invention.

A. First Embodiment
A-1. Configuration of Printing System
A-2. Printing Process
A-3. Printing Mode
B. Second Embodiment
C. Modified Examples
A. First Embodiment
A-1. Configuration of Printing System FIG. 1 is a schematic diagram illustrating a configuration of a printing system according to a first embodiment of the invention. The printing system 10 according to the embodiment includes a printer 100 and a personal computer (PC) 200. The printer 100 is an ink jet type color printer which prints an image by ejecting ink to form ink dots on a printing medium (for example, a printing paper or a transparent film).

The PC 200 functions as a printing control device which supplies print data to the printer 100 and controls printing operations of the printer 100. The printer 100 and the PC 200 are connected to each other in a wired or wireless manner so that information may be able to be communicated. More specifically, in the embodiment, the printer 100 and the PC 200 are connected to each other through a USB cable.

The printer 100 according to the embodiment is a printer which performs printing by using a total of five colors of ink, cyan (C), magenta (M), yellow (Y), black (K), and white (W). The printing system 10 according to the embodiment implements a printing process of simultaneously a color image and a white image on a transparent film as a printing medium. The transparent film on which a color image and a white image are formed is used as, for example, a film for wrapping a product.

In addition, in this specification, toning a color by mixing white ink with other color ink is referred to as "white toning". In addition, a color (toned white color) generated by the white toning is referred to as a "toned white", and an image configured with the toned white is referred to as a "toned white image". The aforementioned "white image" includes not only a pure white image formed by using only the white ink but also a toned white image.

In addition, in this specification, the "white color" denotes, for example, a color (1) within a color range which is on a circumference of or within a circle having a radius of 20 in a*b* plane and of which the L* is indicated by 70 or more in the notation of the Lab system in the case where color measurement is performed by using a colorimeter Eye-One Pro produced by X-Rite in the conditions that colorimetry mode is spot colorimetry, light source is D50, backing is Black, and printing medium is a transparent film; a color (2) within a color range which is on a circumference of or within a circle having a radius of 20 in a*b* plane and of which the L* is indicated by 70 or more in the notation of the Lab system in the case where color measurement is performed by using a colorimeter CM2022 produced by Minolta in the conditions that measurement mode is a D502° viewing field, SCF mode, and white paper back; or a color (3) of the ink used as a background of an image disclosed in JP-A-2004-306591. The white color is not limited to a pure white color.

Figure 2:
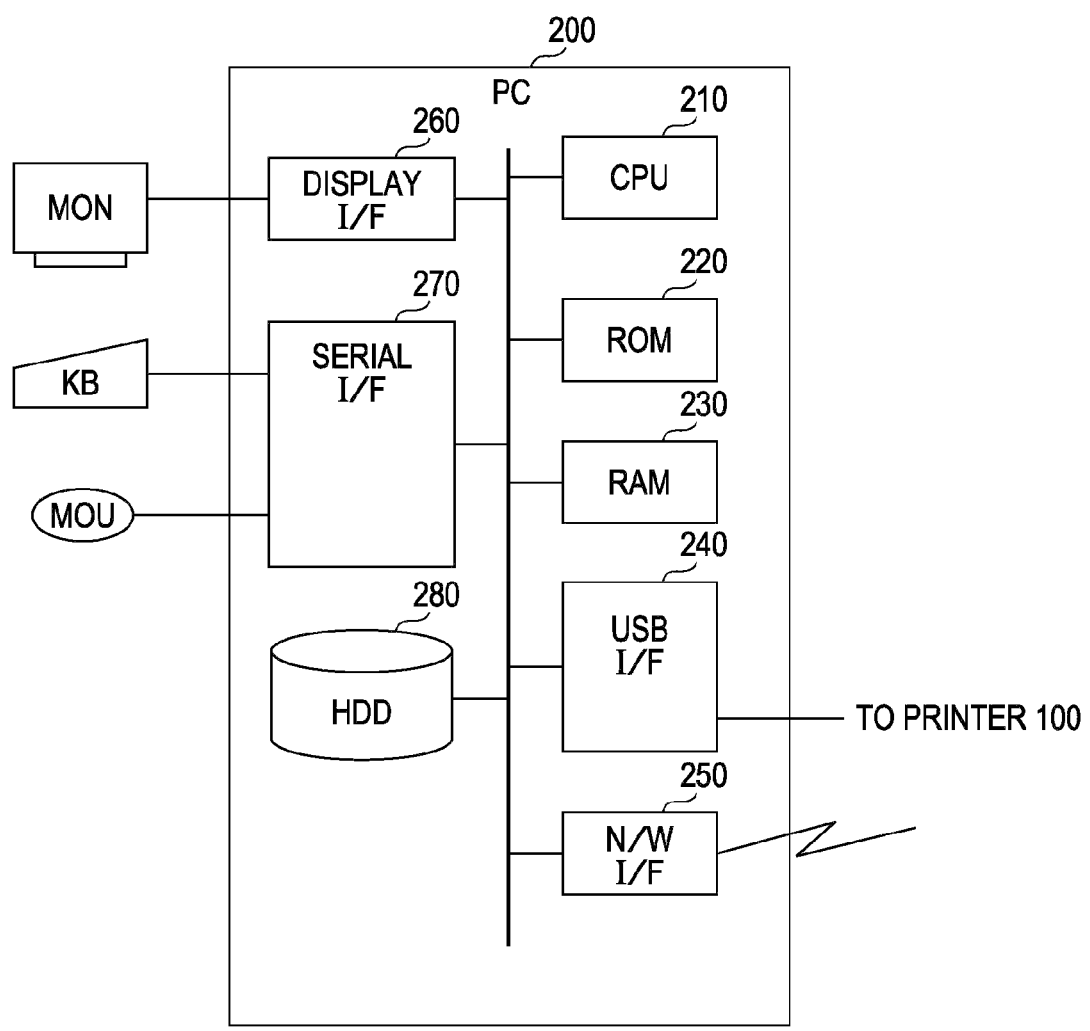
FIG. 2 is a schematic diagram illustrating a configuration of a PC.

FIG. 2 is a schematic diagram illustrating a configuration of the PC 200. The PC 200 includes a CPU 210, a ROM 220, a RAM 230, a USB interface (USB I/F) 240, a network interface (N/W I/F) 250, a display interface (display I/F) 260, a serial interface (serial I/F) 270, and a hard disk drive (HDD) 280. The components of the PC 200 are connected to each other via a bus.

The PC 200 is connected to the printer 100 through the USB interface 240. A monitor MON as a display device is connected to the display interface 260. A keyboard KB and a mouse MOU as input devices are connected to the serial interface 270. In addition, the configuration of the PC 200 illustrated in FIG. 2 is only an exemplary one. The configuration of the PC 200 may be modified by omitting some portions of the components of the PC 200 or by adding further components to the PC 200.

Figure 3:
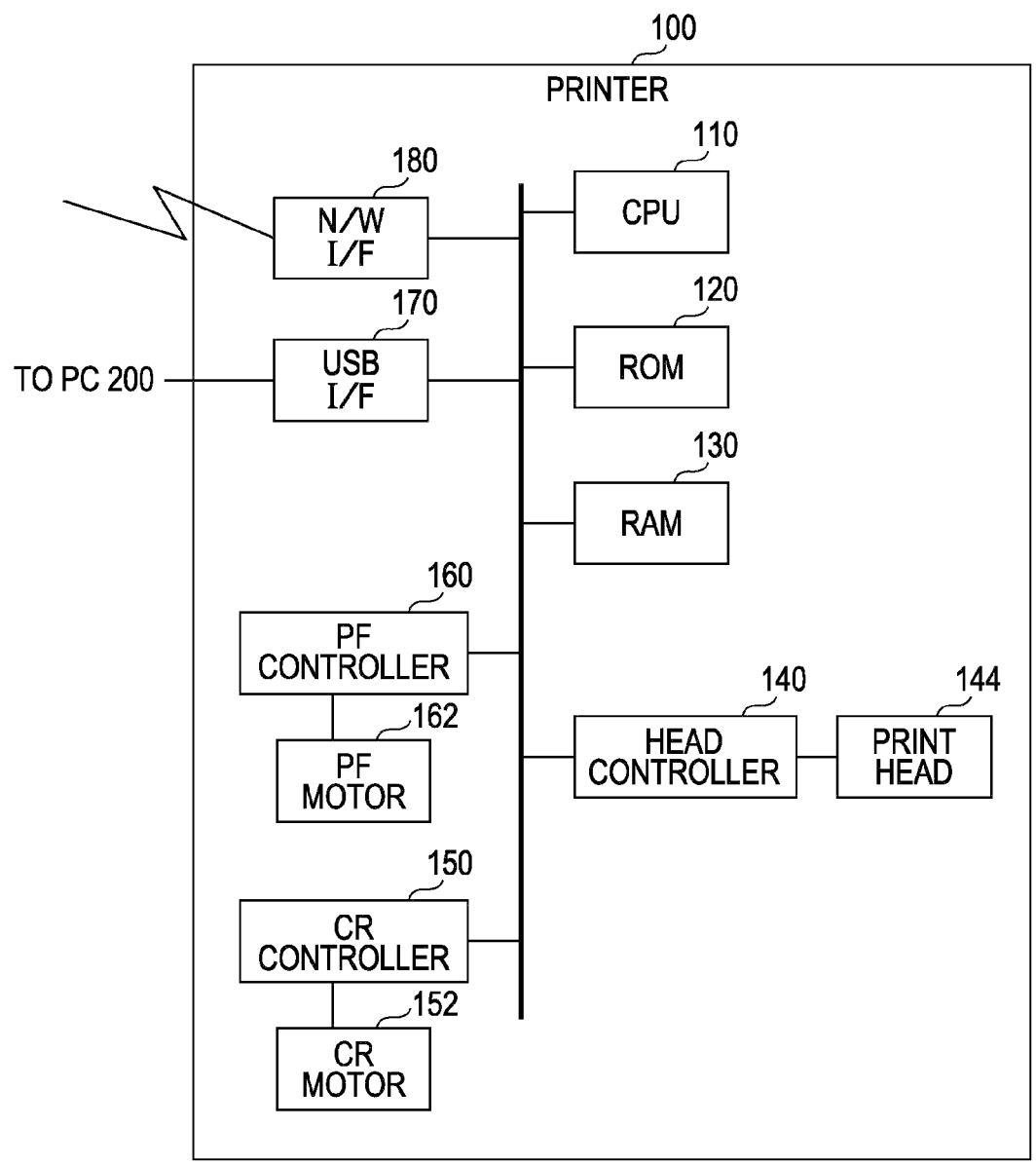
FIG. 3 is a schematic diagram illustrating a configuration of a printer.

FIG. 3 is a schematic diagram illustrating a configuration of the printer 100. The printer 100 includes a CPU 110, a ROM 120, a RAM 130, a head controller 140, a print head 144, a carriage controller (CR controller) 150, a carriage motor (CR motor) 152, a printing medium transporting controller (PF controller) 160, a printing medium transporting motor (PF motor) 162, a USB interface (USB I/F) 170, and a network interface (N/W I/F) 180. The components of the printer 100 are connected to each other via a bus.

The CPU 110 according to the printer 100 functions as a controller which controls the entire operations of the printer 100 by executing a computer program stored in the ROM 120. The print head 144 of the printer 100 includes a plurality of nozzle columns corresponding to each of the ink colors.

Figure 4:
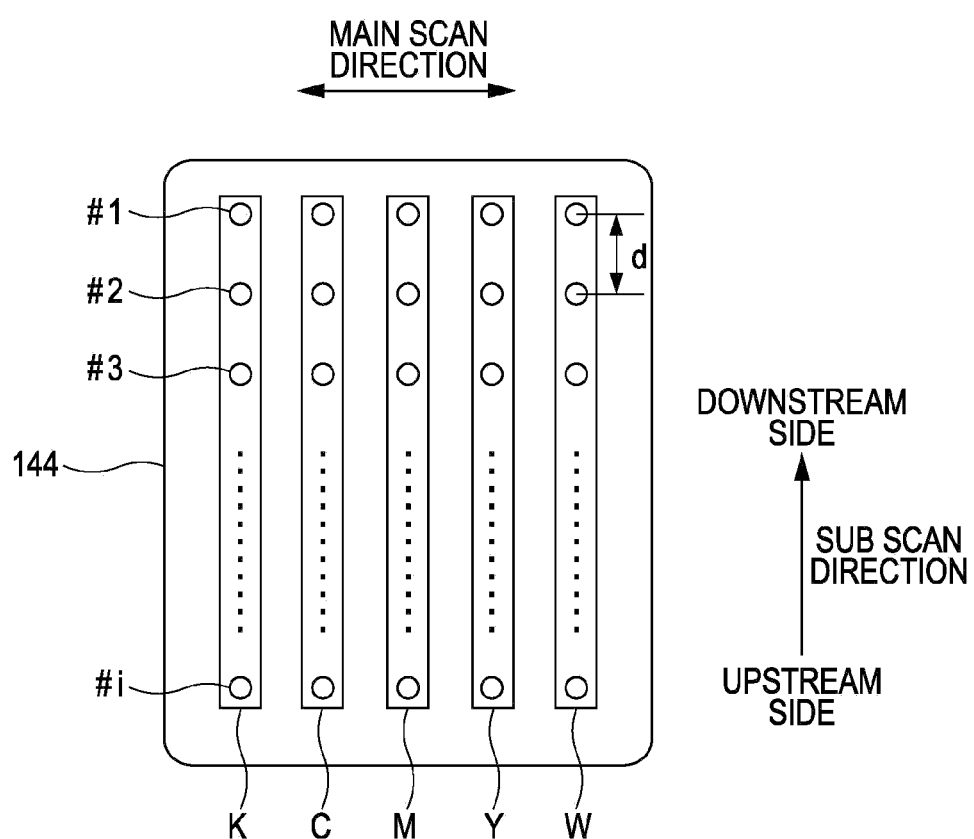
FIG. 4 is a diagram illustrating a configuration of a print head.

FIG. 4 is a diagram illustrating a configuration of the print head 144. The print head 144 according to the embodiment includes five nozzle columns corresponding to the five colors of ink. Five nozzle columns are disposed to be aligned in a main scan direction (described later) on one surface of the print head 144. Each nozzle column is configured with a plurality of (the number of i) nozzles which are aligned with a pitch d in a sub scan direction (described later).

The print head 144 (FIG. 3) is mounted on a carriage (not shown). The carriage controller 150 controls the carriage motor 152 to reciprocatingly move the carriage in a predetermined direction (main scan direction). Accordingly, a main scan in which the print head 144 reciprocatingly moves in the main scan direction with respect to the printing medium is implemented. In addition, the printing medium transporting controller 160 controls the printing medium transporting motor 162 to perform a transporting operation (sub scan) in which the printing medium is transported in a direction (sub scan direction) substantially perpendicular to the main scan direction. The head controller 140 controls ink ejection from each nozzle of the print head 144. The CPU 110 controls each component of the printer 100 to implement formation of an image (printing of image) on the printing medium by repeatedly executing the image forming operation (hereinafter, also referred to as "printing pass") of performing ink ejection during main scan and sub scan. In addition, the main scan direction corresponds to a second direction in the invention, and the sub scan direction corresponds to a first direction in the invention.

Figure 5:
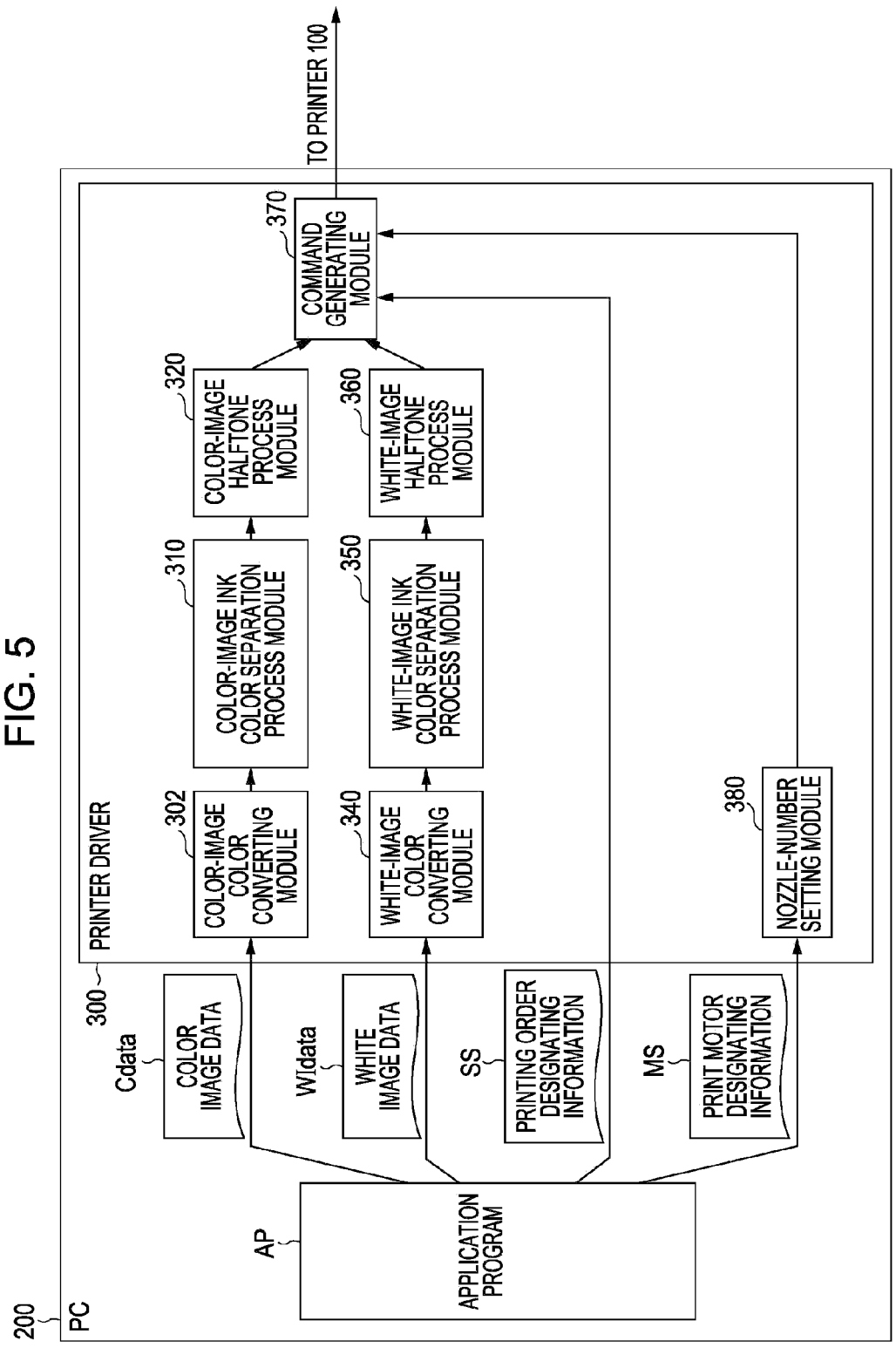
FIG. 5 is a functional block diagram illustrating the configuration of the PC.

FIG. 5 is a functional block diagram illustrating the configuration of the PC 200. As a computer program executed by the CPU 210, an application program AP and a printer driver 300 are stored in the ROM 220 (FIG. 2) of the PC 200. The application program AP is a program for generating, editing, and the like an image (hereinafter, referred to as a "printing image PI") which becomes an object of printing on a transparent film as a printing medium. The CPU 210 implements generating and editing of the printing image PI by executing the application program AP.

In addition, the CPU 210 which executes the application program AP outputs color image data Cdata, white image data WIdata, printing order designating information SS, and printing mode designating information MS to the printer driver 300 in response to a printing performing command by a user. The contents of each of the data are described in detail in "A-2. Printing Process".

The printer driver 300 is a program for implementing printing of the printing image PI by controlling the printer 100 (FIG. 1). The CPU 210 (FIG. 2) of the PC 200 implements the printing control of the printing image PI by the printer 100 by executing the printer driver 300.

As illustrated in FIG. 5, the printer driver 300 includes a color-image color converting module 302, a color-image ink color separation process module 310, a color-image halftone process module 320, a white-image color converting module 340, a white-image ink color separation process module 350, a white-image halftone process module 360, a nozzle-number setting module 380, and a command generating module 370. The function of each module is described in detail in "A-2. Printing Process".

Figure 6:
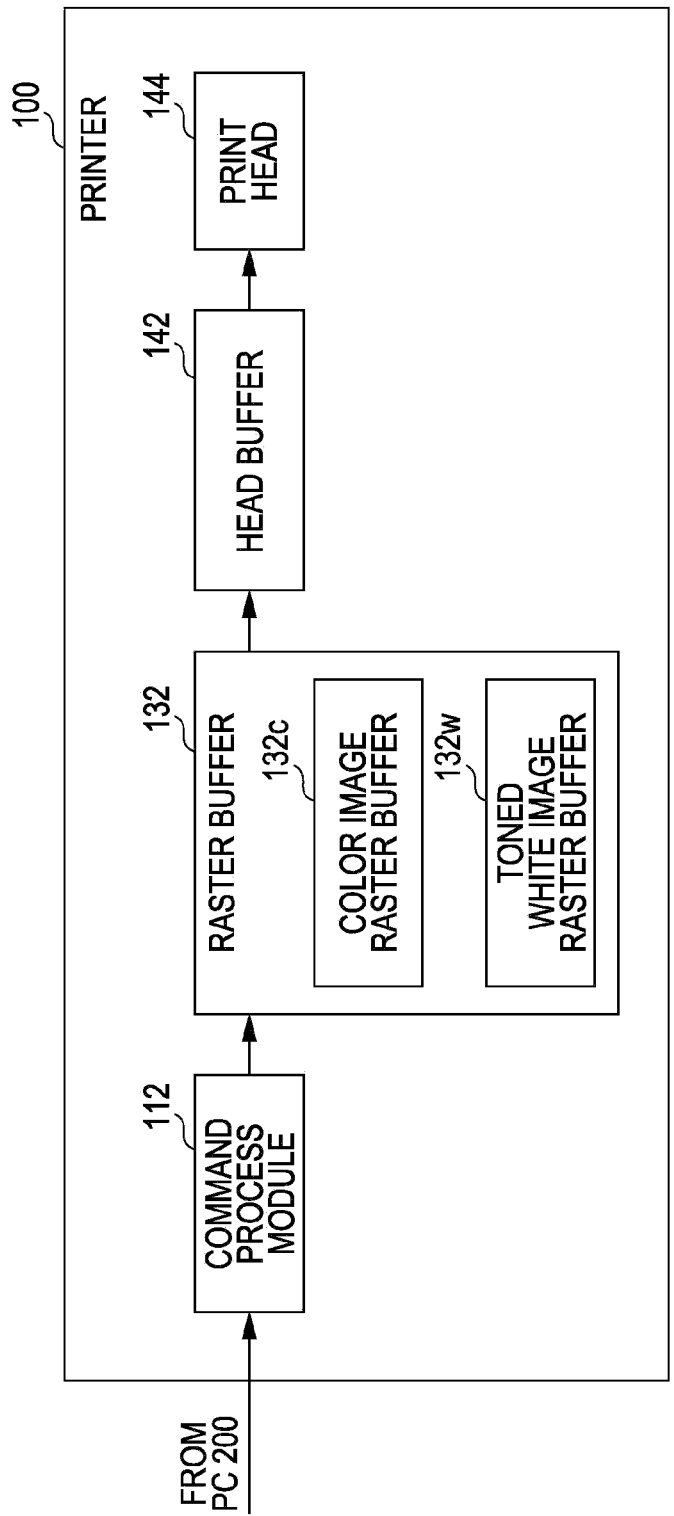
FIG. 6 is a functional block diagram illustrating the configuration of the printer.

FIG. 6 is a functional block diagram illustrating the configuration of the printer 100. As a computer program executed by the CPU 110, a command process module 112 is stored in the ROM 120 (FIG. 3) of the printer 100. The CPU 110 implements processing a command received from the PC 200 by executing the command process module 112. In addition, the RAM 130 (FIG. 3) of the printer 100 includes a raster buffer 132. The raster buffer 132 includes two areas, that is, a color image raster buffer 132c and a white image raster buffer 132w. In addition, the head controller 140 (FIG. 3) of the printer 100 includes a head buffer 142. The functions of such programs or buffers are described in detail in "A-2. Printing Process".

A-2. Printing Process

Figure 7A:
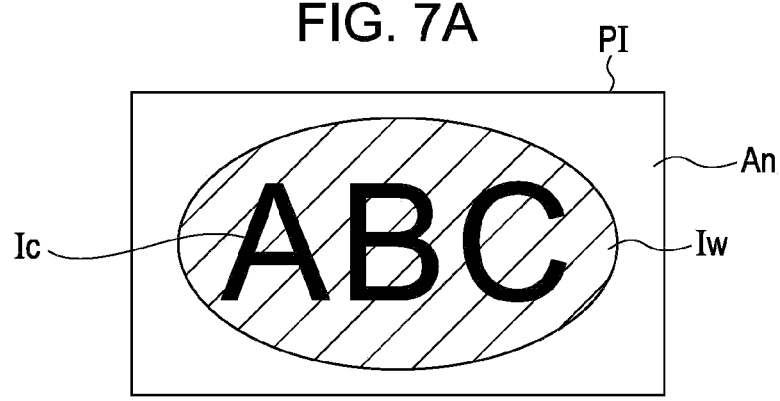
FIGS. 7A to 7C are diagrams illustrating examples of printed images formed by a printing process in the printing system according to the embodiment.
Figure 7B:
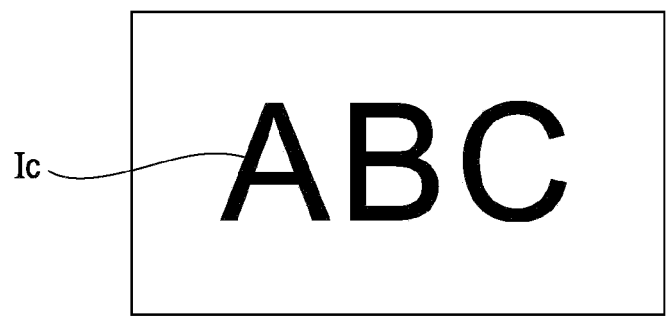
Figure 7C:
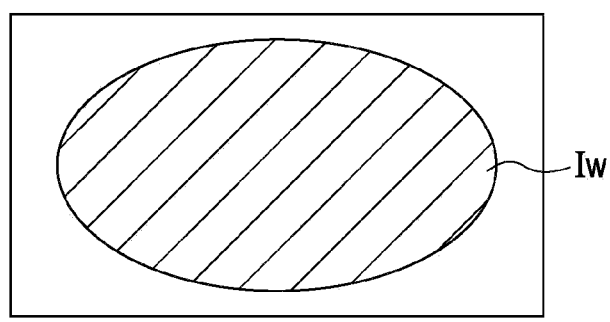

FIGS. 7A to 7C are diagrams illustrating examples of printed images formed by a printing process in the printing system 10 according to the embodiment. As illustrated in FIG. 7A, the printing image PI is an image formed by overlapping a color image Ic (image "ABC" in FIG. 7B) illustrated in FIG. 7B and a white image Iw illustrated in FIG. 7C. In addition, the area in which neither color image Ic nor white image Iw is formed in the printing image PI becomes a non-formed area An. In the printing process according to the embodiment, since the transparent film as a printing medium is used, the non-formed area An becomes a transparent area. The color image Ic corresponds to the first image in the invention, and the white image Iw corresponds to the second image in the invention.

The printing process starts if the CPU 210 (FIG. 2) of the PC 200 which executes the application program AP (FIG. 5) receives the printing performing command from the user. The CPU 210 outputs the color image data Cdata, the white image data WIdata, the printing order designating information SS, and the printing mode designating information MS to the printer driver 300 in response to the reception of the printing performing command (refer to FIG. 5).

The color image data Cdata is a data specifying the color image Ic in the printing image PI. More specifically, the color image data Cdata is a data specifying a color of each pixel of the color image Ic with, for example, RGB values.

The white image data WIdata is a data specifying the white image Iw in the printing image PI. More specifically, the white image data WIdata is data specifying a color of each pixel of the white image Iw with, for example, Lab values. In addition, in general, there are may cases where the white image Iw is an image of a kind of a white color (including toned white). In this case, the pixel values of the pixels are equal. For this reason, the white image data WIdata may be a combination of a 2-bit data of each pixel for specifying an area where the white image Iw is formed in the printing image PI and a data (Lab value) specifying a color of the white image Iw. In addition, the color of the white image Iw is designated, for example, through the keyboard KB or the mouse MOU by the user. Alternatively, the color of the white image Iw may be designated by colorimetry of an object (for example, an actual printed material).

Figure 8A:
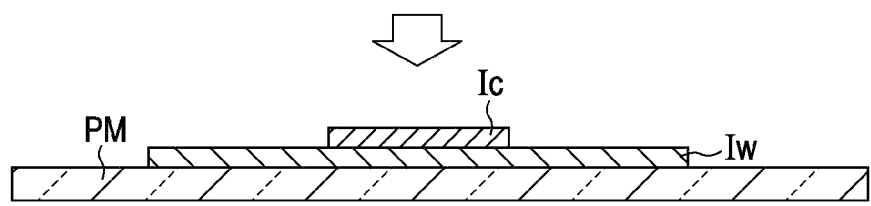
FIGS. 8A and 8B are diagrams illustrating printing orders for a color image and a white image.
Figure 8B:
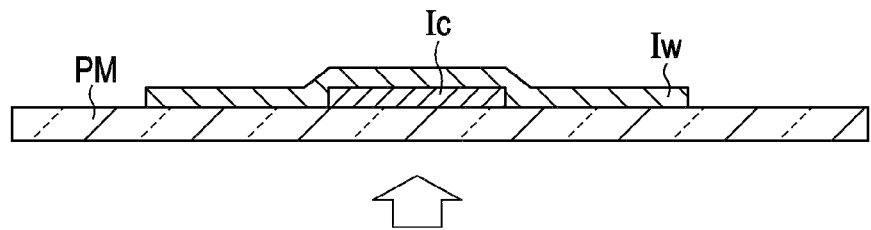

The printing order designating information SS is information specifying a printing order for the color image Ic and the white image Iw. FIGS. 8A and 8B are diagrams illustrating the printing orders for the color image Ic and the white image Iw. FIG. 8A illustrates a printing order of forming a white image Iw on a transparent film as a printing medium PM and forming a color image Ic on the white image Iw. In this specification, the printing order is referred to as a "white-color printing" or a "W-C printing". In the W-C printing illustrated in FIG. 8A, an observer observes a printed material from the top side of the figure (refer to the arrow in the figure).

FIG. 8B illustrates a printing order of forming a color image Ic on a transparent film as a printing medium PM and forming a white image Iw on the color image Ic. In this specification, the printing order is referred to as a "color-white printing" or a "C-W printing". In the C-W printing illustrated in FIG. 8B, an observer observes a printed material from the bottom side of the figure (refer to the arrow in the figure).

The user selects performing of the W-C printing or performing of the C-W printing according to an aspect of usage of the printed material. The CPU 210 which executes the application program AP outputs the printing order designating information SS specifying the printing order selected by the user to the printer driver 300 (FIG. 5).

The printing mode designating information MS is information specifying a printing mode, that is, an image quality precedence mode or a speed precedence mode. The user select the printing mode according to a time allowed as a printing time or an image quality required for each of the color image Ic and the white image Iw. The CPU 210 which executes the application program AP outputs the printing mode designating information MS specifying the printing mode selected by the user to the nozzle-number setting module 380 of the printer driver 300 (FIG. 5). The nozzle-number setting module 380 sets the number of nozzles used for forming the color image Ic and the white image Iw based on the printing mode designating information MS and outputs information specifying the number of nozzles to the command generating module 370. In addition, details of the printing mode will be described later.

If each of the data and the information output from the application program AP is received by the printer driver 300 (FIG. 5), a process of the CPU 210 which executes the printer driver 300 starts. The printer driver 300 performs a color converting process, an ink color separation process, and a halftone process on each of the color image Ic and the white image Iw. More specifically, the color image data Cdata having the RGB value is color-converted into the CMYK value by the color-image color converting module 302; the CMYK value is converted into a grayscale value for each ink color by the color-image ink color separation process module 310; and the grayscale value for each ink color is converted into color-image dot data defining ON/OFF of dots of each ink color of each pixel by the color-image halftone process module 320. In addition, the white image data WIdata having the Lab value is color-converted into a CMYK value by the white-image color converting module 340; the CMYK value is converted into a grayscale value for each ink color by the white-image ink color separation process module 350; and the grayscale value for each ink color is converted into white-image dot data defining ON/OFF of dots of each ink color of each pixel by the white-image halftone process module 360.

The generated color-image dot data and white-image dot data together with the printing order designating information SS and the printing mode designating information MS are received by the command generating module 370 (FIG. 5). The command generating module 370 generates a printing command for allowing the printer 100 to perform printing the printing image PI in the printing order designated by the printing order designating information SS and in the printing mode designated by the printing mode designating information MS based on the color-image dot data, the white-image dot data, and the information specifying the number of nozzles used forming the color image Ic and the white image Iw received from the nozzle-number setting module 380 and outputs the printing command to the printer 100.

The CPU 110 which executes the command process module 112 (FIG. 6) of the printer 100 receives the printing command transmitted from the printer driver 300 of the PC 200 and processes the printing command. More specifically, the command process module 112 stores the raster data (dot data) included in the printing command in the raster buffer 132. At this time, the raster data for the color image Ic are stored in the color image raster buffer 132c, and the raster data for the white image Iw is stored in the white image raster buffer 132w. In addition, if a predetermined number of the raster data are stored in the raster buffer 132, the command process module 112 transmits the raster data from the raster buffer 132 to the head buffer 142. The CPU 110 executes the printing of the printing image PI by performing the sub scan by controlling the printing medium transporting controller 160 and the printing medium transporting motor 162 and by performing the main scan by controlling the CR controller 150 and the CR motor 152 based on the raster data stored in the head buffer 142.

A-3. Printing Mode

Figure 9:
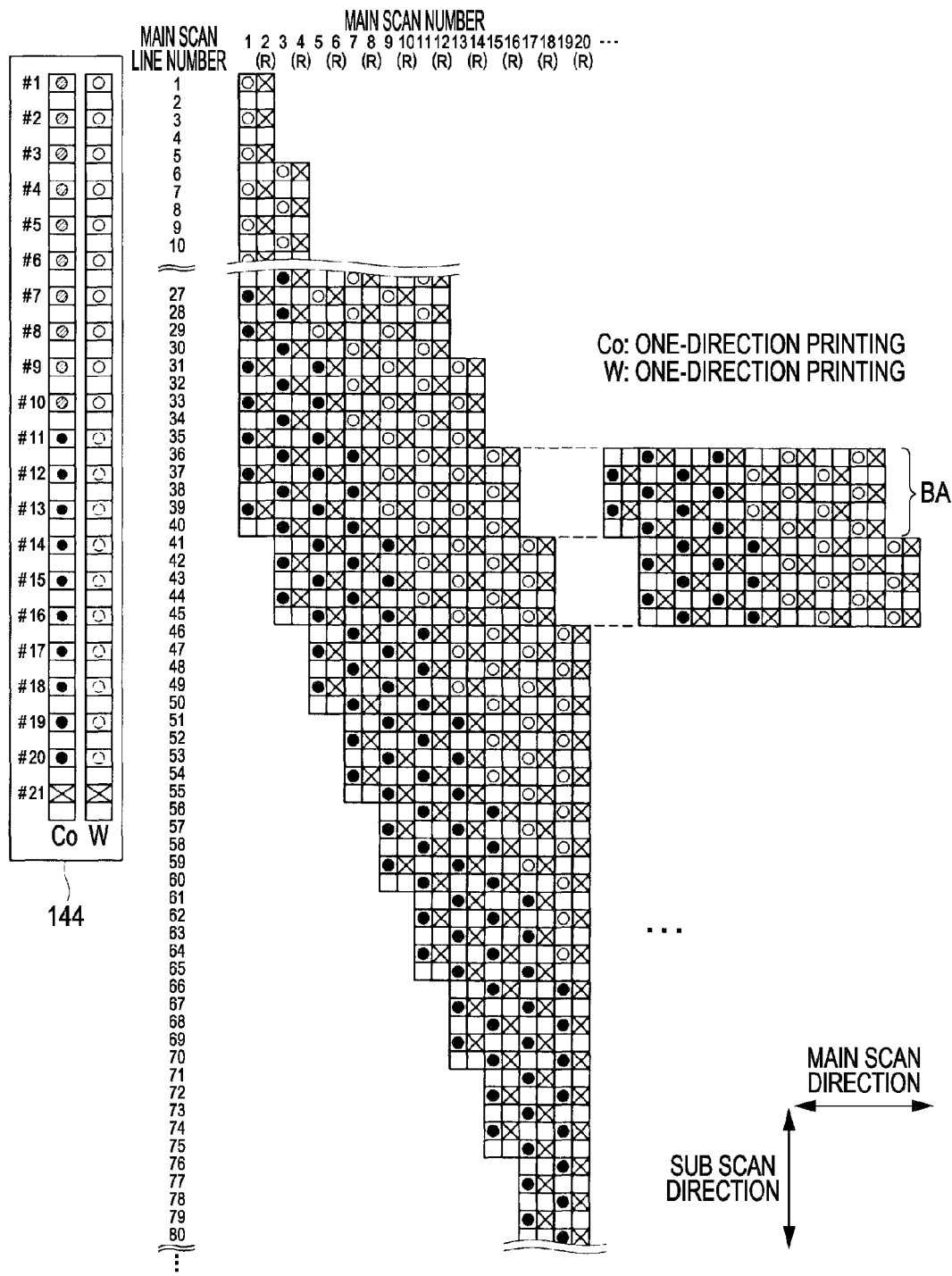
FIG. 9 is a diagram illustrating a printing method in each printing mode of the first embodiment.

The printing system 10 according to the first embodiment performs a printing process of forming a color image Ic and a white image Iw on a printing medium in an overlapping manner by two printing modes of a printing mode A10 of printing image quality precedence and a printing mode B10 of printing speed precedence. FIGS. 9 and 10 are diagrams illustrating printing methods in each printing mode of the first embodiment. The left side of each figure illustrates a layout of the nozzle group used for forming the color image Ic and the white image Iw in the nozzle columns of the print head 144 (FIG. 4), and the left side thereof illustrates the positions in the sub scan direction of the nozzle columns of each printing pass (each image forming operation).

In addition, in each figure, the nozzle column denoted by "W" indicates the nozzle column (hereinafter, referred to as a "white nozzle column W") corresponding to the white color, and the nozzle column denoted by "Co" representatively indicates one of the nozzle columns (hereinafter, referred to as "color nozzle columns Co") corresponding to the colors (cyan (C), magenta (M), yellow (Y), and black (K)) other than the white color. The layouts of the nozzle groups used for forming the color image Ic and the white image Iw in the C, M, Y, and K color nozzle columns Co are in common. The white nozzle column W corresponds to a second nozzle column in the invention, and at least one of the color nozzle columns Co corresponds to a first nozzle column in the invention. Among the nozzles constituting the color nozzle column Co of each figure, the nozzles indicated by black circles are the nozzles used for forming the color image Ic, and the nozzles indicated by hatched circles are the nozzles not used for forming the color image Ic. In addition, among the nozzles constituting the white nozzle column W of each figure, the nozzles indicated by white circles drawn by solid lines are the nozzles used for forming the white image Iw, and the nozzles indicated by white circles drawn by broken lines are the nozzles not used for forming the white image Iw. In addition, as described above, since a toned white image is included in the white image Iw, there is a case where the nozzles indicated by hatched circles among the nozzles constituting the color nozzle column Co are not used for forming the color image Ic but used forming the white image Iw (toned white image). In addition, in each figure illustrating positions in the sub scan direction of the nozzle columns in each printing pass of the right side of each figure, passes not attached with the symbols "(R)" under the numerals indicating the main scan numbers denotes the passes of one direction (forward direction) in the main scan direction, and passes attached with the symbols "(R)" denotes the passes of the opposite direction (backward direction) in the main scan direction. In addition, black circles indicate the positions in the sub scan direction of the nozzles used for forming the color image Ic; white circles indicate the positions in the sub scan direction of the nozzles used for forming the white image Iw; and marks x indicate the positions of the nozzles which do not eject ink. The meaning of the symbols in the figure is the same as that in the figures corresponding to embodiments hereinafter.

FIG. 9 illustrates a printing method in the printing mode A10 of printing image quality precedence. In the first embodiment, each nozzle column includes 20 nozzles, and the nozzle pitch d is for two rasters. As illustrated in FIG. 9, in the printing mode A10, 10 nozzles (hereinafter, referred to as a "first image nozzle group in the printing mode A10") of the 11-th to 20-th nozzles among the nozzles constituting the color nozzle column Co are used for forming the color image Ic, and other nozzles are not used for forming the color image Ic. In addition, 10 nozzles (hereinafter, referred to as a "second image nozzle group in the printing mode A10") of the first to 10-th nozzles among the nozzles constituting the white nozzle column W are used for forming the white image Iw, and other nozzles are not used for forming the white image Iw. In other words, in the printing mode A10, the number of nozzles in the color nozzle column Co used for forming the color image Ic is equal to the number of nozzles in the white nozzle column W used for forming the white image Iw.

As illustrated in FIG. 9, in the printing mode A10, a total of eight passes, that is, four forward-direction printing passes and four backward-direction empty passes (movement of the print head 144 in the main scan direction, where ink ejection is not performed) are necessary to complete printing of an area (hereinafter, referred to as a "unit band BA") having a predetermined width in the sub scan direction of the color image Ic. More specifically, with respect to the main scan direction, each raster is formed by two printing passes (in other words, each raster is formed by using two different nozzles). In addition, as the number of nozzles used for forming one raster is increased, the discrepancy in the ink dot position caused by mechanical variation in the nozzle position is hardly noticeable, so that image quality is improved. The resolution of each printing pass in the main scan direction is equal to the maximum resolution of the printer 100. In addition, with respect to the sub scan direction, dots formed by different one printing pass are disposed between a plurality of dots formed by each printing pass. Therefore, the sub scan direction resolution of the color image Ic becomes the resolution twice finer (more accurate) than the nozzle pitch, and the main scan direction resolution thereof also becomes the resolution twice finer than the maximum resolution of the printer 100. In addition, in general, the finer the printing resolution is, the more the image quality of the printing image is improved.

In addition, as described above, when the color image Ic is formed in the printing mode A10, no ink is ejected from the first image nozzle group in the backward-direction pass, but the ink is ejected only in the forward-direction pass. In this manner, if an image is formed by ejecting the ink only in one-directional pass, the ink overlapping orders for the colors in each raster are the same, so that occurrence of color irregularity is suppressed. Therefore, in comparison with the case where an image is formed by ejecting the ink in the bi-direction passes, the image quality is improved.

In addition, as illustrated in FIG. 9, similarly to the color image Ic, for the white image Iw, in the printing mode A10, a total of eight passes, that is, four forward-direction printing passes and four backward direction empty passes are necessary to complete printing of the unit band BA. The sub scan direction resolution of the white image Iw becomes the resolution twice finer than the nozzle pitch, and the main scan direction resolution thereof also becomes the resolution twice finer than the maximum resolution of the printer 100.

In this manner, in the printing mode A10, eight passes (four forward direction printing passes and four backward direction empty passes) are necessary to print the unit band BA of the color image Ic, and eight passes (four forward direction printing passes and four backward direction empty passes) are necessary to print the unit band BA of the white image Iw, so that a total of 16 passes are necessary to print the unit band BA of the printing image PI. In addition, the sub scan direction resolution of the printing image PI for both the color image Ic and the white image Iw is the resolution twice finer than the nozzle pitch, and the main scan direction resolution thereof for both the color image Ic and the white image Iw is the resolution twice finer than the maximum resolution of the printer 100. In addition, the printing process illustrated in FIG. 9 is a color-white printing (C-W printing) in which a color image Ic is formed on a printing medium and a white image Iw is formed on the color image Ic. Similarly, the printing processes illustrated in the figures corresponding to other printing modes of the embodiment and the other embodiments are the color-white printing.

FIG. 10 illustrates a printing method in the printing mode B10 of printing speed precedence. As illustrated in FIG. 10, in the printing mode B10, 14 nozzles (hereinafter, referred to as a "first image nozzle group in the printing mode B10") of the 8-th to 21-th nozzles among the nozzles constituting the color nozzle column Co are used for forming the color image Ic, and other nozzles are not used for forming the color image Ic. In addition, seven nozzles (hereinafter, referred to as a "second image nozzle group in the printing mode B10") of the first to seventh nozzles among the nozzles constituting the white nozzle column W are used for forming the white image Iw, and other nozzles are not used for forming the white image Iw. In other words, in the printing mode B10, the number of nozzles in the color nozzle column Co used for forming the color image Ic is larger than the number of nozzles in the white nozzle column W used for forming the white image Iw. More specifically, the number of nozzles in the color nozzle column Co used for forming the color image Ic is twice the number of nozzles in the white nozzle column W used for forming the white image Iw. Therefore, in the printing mode B10, in comparison with the aforementioned printing mode A10, the number of nozzles used for forming the color image Ic is large and the number of nozzles used for forming the white image Iw is small.

As illustrated in FIG. 10, in the printing mode B10, similarly to the printing mode A10 illustrated in FIG. 9, a total of eight passes, that is, four forward-direction printing passes and four backward-direction empty passes are necessary to complete printing of the unit band BA of the color image Ic. The sub scan direction resolution of the color image Ic becomes the resolution twice finer than the nozzle pitch, and the main scan direction resolution thereof also becomes the resolution twice finer than the maximum resolution of the printer 100.

In addition, as illustrated in FIG. 10, in the printing mode B10, a total of four passes, that is, two forward-direction printing passes and two backward-direction printing passes are necessary to complete printing of the unit band BA of the white image Iw. More specifically, with respect to the main scan direction, each raster is formed by two printing passes (in other words, each raster is formed by using two different nozzles). The resolution of each printing pass in the main scan direction is equal to the maximum resolution of the printer 100. In addition, with respect to the sub scan direction, dots formed by one different printing pass are disposed between a plurality of dots formed by each printing pass. Therefore, the sub scan direction resolution of the white image Iw becomes the resolution twice finer than the nozzle pitch, and the main scan direction resolution thereof also becomes the resolution twice finer than the maximum resolution of the printer 100.

In this manner, in the printing mode B10, eight passes (four forward direction printing passes and four backward direction empty passes) are necessary to print the unit band BA of the color image Ic, and four passes (two forward direction printing passes and two backward direction printing passes) are necessary to print the unit band BA of the white image Iw, so that a total of 12 passes are necessary to print the unit band BA of the printing image PI. In addition, the sub scan direction resolution of the printing image PI for both the color image Ic and the white image Iw is the resolution twice finer than the nozzle pitch, and the main scan direction resolution thereof for both the color image Ic and the white image Iw is the resolution twice finer than the maximum resolution of the printer 100.

As described above, in the printing system 10 according to the embodiment, since the position of the first image nozzle group used for forming the color image Ic and the position of the second image nozzle group used for forming the white image Iw of which at least a portion is overlapped with the color image Ic in the sub scan direction are different from each other, it is possible to implement the printing process of simultaneously forming the color image Ic and the white image Iw. In addition, in the printing system 10 according to the embodiment, since it is possible to implement the printing process of simultaneously forming the color image Ic and the white image Iw without providing a head or a nozzle column for forming the white image Iw at the sub scan direction upstream side and/or downstream side of a head or a nozzle column for forming the color image Ic, so that it is possible to suppress an increase in a size of the apparatus.

In addition, in the printing mode B10 of the printing system 10 according to the embodiment, with respect to the white image Iw, the image is formed by the bi-direction printing passes, that is, the forward direction and backward direction printing passes, and with respect to the color image Ic, the image is formed by only the forward direction printing pass. Therefore, it is possible to improve the printing speed while suppressing a deterioration in the image quality of the color image Ic. In addition, in the printing mode B10, since the white image Iw is formed by the bi-direction printing passes, for example, in the case where the other color ink in addition to the white ink is used for forming the white image Iw, color irregularity occurs due to a difference in the color overlapping order, so that the image quality of the white image Iw may deteriorate. However, in the case where the white image Iw is formed by only the white ink, although the image is formed by the bi-direction printing passes, the color irregularity does not occur due to the difference in the color overlapping order. Therefore, by using the printing mode B10, it is possible to improve the printing speed while suppressing a deterioration in the image qualities of the color image Ic and the white image Iw. In this manner, in the printing mode B10 of the printing system 10 according to the embodiment, it is possible to perform printing of images by a method according to characteristics of two images (the color image Ic and the white image Iw), so that it is possible to implement a suitable printing process according to the use or the purpose.

In addition, in the printing mode B10 of the printing system 10 according to the embodiment, the number of nozzles in the color nozzle column Co used for forming the color image Ic is larger than the number of nozzles in the white nozzle column W used for forming the white image Iw. Therefore, in the printing mode B10 of the printing system 10 according to the embodiment, the white image Iw is formed by the bi-direction printing passes, and the color image Ic is formed by the forward-direction printing pass, so that it is possible to reduce the printing time. Particularly, in the printing mode B10 of the printing system 10 according to the embodiment, since the number of nozzles in the color nozzle column Co used for forming the color image Ic is twice the number of nozzles in the white nozzle column W used for forming the white image Iw, it is possible to reduce the printing time as much as possible.

In addition, in the printing mode A10 of the printing system 10 according to the embodiment, since both the color image Ic and the white image Iw are formed by only the forward direction printing pass, there is a case where the printing mode B10 is faster than the printing mode A10 with respect to printing speed, and the printing mode A10 is preferred to the printing mode B10 when considering the deterioration in the image quality of the white image Iw. Therefore, in the printing system 10 according to the embodiment, for example, in the case where the reduction of the printing time is preferred to the suppression of the deterioration in the image quality of the white image Iw, the printing mode B10 is selected, and on the contrary, in the case where the suppression of the deterioration in the image quality of the white image Iw is preferred to the reduction of the printing time, the printing mode A10 is selected. In this manner, it is possible to implement a suitable printing process according to the use or the purpose.

B. Second Embodiment

A printing system 10 according to a second embodiment may perform a printing process of forming a color image Ic and a white image Iw to overlap on a printing medium by two printing modes, that is, a printing mode A20 in which printing image quality is preferred and a printing mode B20 in which printing speed is preferred. In addition, the configuration of the printing system 10 is the same as that of the first embodiment except for the configuration of the print head 144a. FIGS. 11 and 12 are diagrams illustrating printing methods in each printing mode of the second embodiment. In the second embodiment, each of the nozzle columns of the print head 144a is configured with 40 nozzles, and the nozzle pitch d is for one raster.

FIG. 11 illustrates a printing method in the printing mode A20 of printing image quality precedence. As illustrated in FIG. 11, in the printing mode A20, 20 nozzles (hereinafter, referred to as a "first image nozzle group in the printing mode A20") of the 21-th to 40-th nozzles among the nozzles constituting the color nozzle column Co are used for forming the color image Ic, and other nozzles are not used for forming the color image Ic. In addition, 20 nozzles (hereinafter, referred to as a "second image nozzle group in the printing mode A20") of the first to 20-th nozzles among the nozzles constituting the white nozzle column W are used for forming the white image Iw, and other nozzles are not used for forming the white image Iw. In other words, in the printing mode A20, the number of nozzles in the color nozzle column Co used for forming the color image Ic is equal to the number of nozzles in the white nozzle column W used for forming the white image Iw.

As illustrated in FIG. 11, in the printing mode A20, a total of eight passes, that is, four forward-direction printing passes and four backward-direction empty passes are necessary to complete printing of the unit band BA of the color image Ic. More specifically, with respect to the main scan direction, each raster is formed by four printing passes (in other words, each raster is formed by using four different nozzles). The resolution of each printing pass in the main scan direction is equal to the maximum resolution of the printer 100. In addition, with respect to the sub scan direction, the dots formed in the other printing passes are not disposed between the plurality of dots formed in each printing pass. Therefore, the sub scan direction resolution of the color image Ic becomes the resolution equal to the nozzle pitch, and the main scan direction resolution thereof becomes the resolution four times finer than the maximum resolution of the printer 100.

In addition, when the color image Ic is formed in the printing mode A20, no ink is ejected from the first image nozzle group in the backward-direction pass, but the ink is ejected only in the forward-direction pass. Therefore, the ink overlapping orders for the colors in each raster are the same, so that occurrence of color irregularity is suppressed. Therefore, in comparison with the case where an image is formed by ejecting the ink in the bi-direction passes, the image quality is improved.

In addition, as illustrated in FIG. 11, in the printing mode A20, similarly to the color image Ic, for the white image Iw, a total of eight passes, that is, four forward-direction printing passes and four backward-direction empty passes are necessary to complete printing of the unit band BA. The sub scan direction resolution of the white image Iw becomes the resolution equal to the nozzle pitch, and the main scan direction resolution thereof becomes the resolution four times finer than the maximum resolution of the printer 100.

In this manner, in the printing mode A20, eight passes (four forward direction printing passes and four backward direction empty passes) are necessary to print the unit band BA of the color image Ic, and eight passes (four forward direction printing passes and four backward direction empty passes) are necessary to print the unit band BA of the white image Iw, so that a total of 16 passes are necessary to print the unit band BA of the printing image PI. In addition, the sub scan direction resolution of the printing image PI for both the color image Ic and the white image Iw is the resolution equal to the nozzle pitch, and the main scan direction resolution thereof for both the color image Ic and the white image Iw is the resolution four times finer than the maximum resolution of the printer 100.

FIG. 12 illustrates a printing method in the printing mode B20 of printing speed precedence. As illustrated in FIG. 12, in the printing mode B20, 24 nozzles (hereinafter, referred to as a "first image nozzle group in the printing mode B20") of the 13-th to 36-th nozzles among the nozzles constituting the color nozzle column Co are used for forming the color image Ic, and other nozzles are not used for forming the color image Ic. In addition, 12 nozzles (hereinafter, referred to as a "second image nozzle group in the printing mode B20") of the first to 12-th nozzles among the nozzles constituting the white nozzle column W are used for forming the white image Iw, and other nozzles are not used for forming the white image Iw. In addition, among the nozzles constituting the color nozzle column Co and the white nozzle column W, the 37-th to 40-th nozzles indicated by the mark x are not used for forming any one of the color image Ic and the white image Iw. In other words, in the printing mode B20, the number of nozzles in the color nozzle column Co used for forming the color image Ic is larger than the number of nozzles in the white nozzle column W used for forming the white image Iw. More specifically, the number of nozzles in the color nozzle column Co used for forming the color image Ic is twice the number of nozzles in the white nozzle column W used for forming the white image Iw. Therefore, in the printing mode B20, in comparison with the aforementioned printing mode A20, the number of nozzles used for forming the color image Ic is large and the number of nozzles used for forming the white image Iw is small.

As illustrated in FIG. 12, similarly to the printing mode A20 illustrated in FIG. 11, in the printing mode B20, a total of eight passes, that is, four forward-direction printing passes and four backward-direction empty passes are necessary to complete printing of the unit band BA of the color image Ic. The sub scan direction resolution of the color image Ic becomes the resolution equal to the nozzle pitch, and the main scan direction resolution thereof becomes the resolution four times finer than the maximum resolution of the printer 100.

In addition, as illustrated in FIG. 12, in the printing mode B20, a total of four passes, that is, two forward-direction printing passes and two backward-direction printing passes are necessary to complete printing of the unit band BA of the white image Iw. More specifically, with respect to the main scan direction, each raster is formed by four printing passes (in other words, each raster is formed by using four different nozzles). The resolution of each printing pass in the main scan direction is equal to the maximum resolution of the printer 100. In addition, with respect to the sub scan direction, the dots formed in the other printing passes are not disposed between the plurality of dots formed in each printing pass. Therefore, the sub scan direction resolution of the white image Iw becomes the resolution equal to the nozzle pitch, and the main scan direction resolution thereof becomes the resolution four times finer than the maximum resolution of the printer 100.

In this manner, in the printing mode B20, eight passes (four forward direction printing passes and four backward direction empty passes) are necessary to print the unit band BA of the color image Ic, and four passes (two forward direction printing passes and two backward direction printing passes) are necessary to print the unit band BA of the white image Iw, so that a total of 12 passes are necessary to print the unit band BA of the printing image PI. In addition, the sub scan direction resolution of the printing image PI for both the color image Ic and the white image Iw is the resolution equal to the nozzle pitch, and the main scan direction resolution thereof for both the color image Ic and the white image Iw is the resolution four times finer than the maximum resolution of the printer 100.

As described above, in the printing system 10 according to the second embodiment, since the position of the first image nozzle group used for forming the color image Ic and the position of the second image nozzle group used for forming the white image Iw of which at least a portion is overlapped with the color image Ic in the sub scan direction are different from each other, it is possible to implement the printing process of simultaneously forming the color image Ic and the white image Iw. In addition, in the printing system 10 according to the second embodiment, since it is possible to implement the printing process of simultaneously forming the color image Ic and the white image Iw without providing a head or a nozzle column for forming the white image Iw at the sub scan direction upstream side and/or downstream side of a head or a nozzle column for forming the color image Ic, so that it is possible to suppress an increase in a size of the apparatus.

In addition, in the printing mode B20 of the printing system 10 according to the second embodiment, with respect to the white image Iw, the image is formed by the bi-direction printing passes, that is, the forward direction and backward direction printing passes, and with respect to the color image Ic, the image is formed by only the forward direction printing pass. Therefore, it is possible to improve the printing speed while suppressing a deterioration in the image quality of the color image Ic. In addition, in the printing mode B20, since the white image Iw is formed by the bi-direction printing passes, for example, in the case where the other color ink in addition to the white ink is used for forming the white image Iw, color irregularity occurs due to a difference in the color overlapping order, so that the image quality of the white image Iw may deteriorate. However, in the case where the white image Iw is formed by only the white ink, although the image is formed by the bi-direction printing passes, the color irregularity does not occur due to the difference in the color overlapping order. Therefore, by using the printing mode B20, it is possible to improve the printing speed while suppressing a deterioration in the image qualities of the color image Ic and the white image Iw. In this manner, in the printing mode B20 of the printing system 10 according to the second embodiment, it is possible to perform of printing images by a method according to characteristics of two images (the color image Ic and the white image Iw), so that it is possible to implement a suitable printing process according to the use or the purpose.

In addition, in the printing mode B20 of the printing system 10 according to the second embodiment, since the number of nozzles in the color nozzle column Co used for forming the color image Ic is larger than the number of nozzles in the white nozzle column W used for forming the white image Iw, the white image Iw is formed by the bi-direction printing pass, and the color image Ic is formed by the forward-direction printing pass, so that it is possible to reduce the printing time. Particularly, in the printing mode B20 of the printing system 10 according to the second embodiment, since the number of nozzles in the color nozzle column Co used for forming the color image Ic is twice the number of nozzles in the white nozzle column W used for forming the white image Iw, it is possible to reduce the printing time as much as possible.

In addition, in the printing mode A20 of the printing system 10 according to the second embodiment, since both the color image Ic and the white image Iw are formed by only the forward direction printing pass, there is a case where the printing mode B20 is faster than the printing mode A20 with respect to printing speed, and the printing mode A20 is preferred to the printing mode B20 when considering the deterioration in the image quality of the white image Iw. Therefore, in the printing system 10 according to the second embodiment, for example, in the case where the reduction of the printing time is preferred to the suppression of the deterioration in the image quality of the white image Iw, the printing mode B20 is selected, and on the contrary, in the case where the suppression of the deterioration in the image quality of the white image Iw is preferred to the reduction of the printing time, the printing mode A20 is selected. In this manner, it is possible to implement a suitable printing process according to the use or the purpose.

C. MODIFIED EXAMPLES

In addition, the invention is not limited to the aforementioned embodiments or examples, but it may be implemented in various types without departing from the spirit of the invention. For example, the following modifications are available.

C1. Modified Example 1

In the aforementioned embodiments, although the printing process of forming the color image Ic and the white image Iw in an overlapping manner by the printing system 10 is described, the invention is not limited to the printing process of forming the color image Ic and the white image Iw in an overlapping manner, but it may be generally applied to a printing process of forming two images on a printing medium in an overlapping manner.

In addition, in the aforementioned embodiments, besides the nozzle columns (nozzle columns corresponding to cyan, magenta, yellow, and black) constituting the color nozzle columns Co, the white nozzle column W may be used for forming the color image Ic, and besides the white nozzle column W, the color nozzle columns Co may be used for forming the white image Iw.

C2. Modified Example 2

The configuration of the printing system 10 according to each of the embodiments is merely an example, and various modifications are available for the configuration of the printing system 10. For example, in the aforementioned embodiments, although the printer 100 is a printer which performs printing by using ink of five colors, the printer 100 may be a printer which performs printing by using ink of four or less colors or ink of six or more colors.

In addition, in the aforementioned embodiments, although the printer driver 300 is included in the PC 200 and the printer 100 receives commands from the printer driver 300 of the PC 200 and performs printing, the printer 100 may have the same function as that of the printer driver 300, so that the printer 100 may receive various data or information from the application program AP of the PC 200 and perform printing. Alternatively, the printer 100 may further have the same function as that of the application program AP, so that a process of generating various data and information and a printing process may be performed in the printer 100.

In addition, in the aforementioned embodiments, although the color nozzle column Co or the white nozzle column W is configured with a plurality of the nozzles which are disposed to be aligned in a linear shape in the sub scan direction, the plurality of nozzles constituting each nozzle column is not necessarily disposed in a linear shape, but the plurality of nozzles may be disposed so-called in a zigzag shape. In other words, the layout where the plurality of nozzles is disposed to be aligned in the sub scan direction denotes the layout where the positions of the plurality of nozzles in the sub scan direction are different from each other regardless of the positions of the plurality of nozzles in the main scan direction.

In addition, in the aforementioned embodiments, some of the configuration implemented by hardware may be replaced by software, and on the contrary, some of the configuration implemented by software may be replaced by hardware.

In addition, in the case where some or all of the functions of the invention is implemented by software, the software (computer program) may be provided in a form of a computer readable recording medium. In the invention, the "computer readable recording medium" is not limited to a portable recording medium such as a flexible disk and a CD-ROM, but it includes an internal storage device of a computer such as various types of RAMs or ROMs and an external storage device fixed to a computer such as hard disk.

C3. Modified Example 3

In the aforementioned embodiments, although the printing process of simultaneously forming a color image and a toned white image on a transparent film as a printing medium to generate a printed material where the color image and the toned white image are formed is described, the printing medium used for the printing process is not limited to the transparent film, and an arbitrary medium such as a semi-transparent film, paper, or cloth may be selected.

C4. Modified Example 4

The printing method of each printing mode according to each of the embodiments is merely an example, and various modifications are available. For example, in the aforementioned embodiments, in the printing mode of printing speed precedence, the total printing time is reduced while the deterioration in the image quality is suppressed by decreasing the number of nozzles used for forming the white image Iw and increasing the number of nozzles used for forming the color image Ic and by forming the color image Ic by only the forward direction printing pass. However, on the contrary the total printing time may be reduced while the deterioration in the image quality is suppressed by decreasing the number of nozzles used for forming color image Ic and increasing the number of nozzles used for forming the white image Iw and by forming the white image Iw by only the forward direction printing pass. In this case, the printing mode designating information MS is configured to include information indicating which one of the color image Ic and the white image Iw is the image of which the number of nozzles used for forming is decreased. According to this configuration, it is possible to implement a suitable printing process according to which one of the image qualities of the color image Ic and the white image Iw is to be preferred.

In addition, in the printing mode of speed precedence, it may be determined based on the dot data which one of the white image Iw and the color image Ic is the image which is to be formed by the bi-direction printing passes, that is, the forward direction and backward direction printing passes. For example, according to a result of the comparison of the dot data for forming the color image Ic and the dot data for forming the white image Iw, the image of which the number of to-be-used ink dots is smaller may be formed by decreasing the number of to-be-used nozzles and by using the bi-direction printing passes, and the other image may be formed by increasing the number of to-be-used nozzles and by using only the one direction printing pass. According to this configuration, by allowing the deterioration in the image quality of the image of which the number of to-be-formed ink dots is smaller, it is possible to reduce the printing time, so that it is possible to implement a suitable printing process according to the use or the purpose.

In addition, in the aforementioned embodiments, although the ratio of the number of nozzles constituting the first image nozzle group (the number of nozzles used for forming the color image Ic) to the number of nozzles constituting the second image nozzle group (the number of nozzles used for forming the white image Iw) is 1:2, the ratio is not necessarily 1:2. However, if the ratio is set to 1:2, in the printing process of forming the color image Ic by the one-direction printing passes and forming the white image Iw by the bi-direction printing passes, the number of nozzles which are not used is reduced, so that it is possible to efficiently perform the process and to obtain the shortest printing time.

In addition, in the aforementioned embodiments, although the color image Ic is formed by only the forward-direction printing passes, the color image Ic may be formed by only the backward-direction printing passes.

The entire disclosure of Japanese Patent Application No. 2010-055425, filed Mar. 12, 2010 is expressly incorporated by reference herein.

What is claimed is:

1. A printing apparatus comprising:
a first nozzle column configured with a plurality of nozzles aligned in a first direction;
a second nozzle column configured with a plurality of nozzles aligned in the first direction, the second nozzle column corresponding to ink different from the ink corresponding to the first nozzle column;
a moving mechanism relatively moving the first nozzle column and the second nozzle column in a second direction with respect to a printing medium, the second direction intersecting the first direction;
a transporting mechanism relatively transporting the printing medium in the first direction with respect to the first nozzle column and the second nozzle column; and
a controller performing controlling that forms an image on the printing medium by repeating an image forming operation of allowing the first nozzle column and the second nozzle column to eject ink and a transporting operation of allowing the printing medium to be transported,
wherein the image forming operation includes the image forming operation of allowing the first nozzle column and the second nozzle column to be moved in a forward pass in the second direction and the image forming operation of allowing the first nozzle column and the second nozzle column to be moved in a backward pass in the second direction;
wherein the controller performs controlling that
forms a first image by the image forming operation in the forward pass by using a first image nozzle group included in the first nozzle column, wherein, in the backward pass, the first image is not formed using the first image nozzle group included in the first nozzle column, and
forms a second image by the image forming operation in the forward pass and the image forming operation in the backward pass by using a second image nozzle group included in the second nozzle column; and
wherein the second image nozzle group is different from the first image nozzle group with respect to the position in the first direction, and at least a portion of the second image is overlapped with the first image on the printing medium.

2. The printing apparatus according to claim 1, wherein the number of nozzles constituting the first image nozzle group is larger than the number of nozzles constituting the second image nozzle group.

3. The printing apparatus according to claim 2, wherein the number of nozzles constituting the first image nozzle group is twice the number of nozzles constituting the second image nozzle group.

4. The printing apparatus according to claim 1, wherein the controller performs forming of the first image and the second image based on a printing mode, wherein the printing mode includes
a first printing mode that forms the first image by the image forming operation in the forward pass by using the first image nozzle group, wherein, in the backward pass, the first image is not formed using the first image nozzle group included in the first nozzle column, and forms the second image by the image forming operation in the forward pass and the image forming operation in the backward pass by using the second image nozzle group, and
a second printing mode that forms the first image by the image forming operation in the forward pass by using the first image nozzle group and forms the second image by the image forming operation in the forward pass by using the second image nozzle group which is configured with the nozzles of which the number is equal to the number of nozzles constituting the first image nozzle group.

5. The printing apparatus according to claim 1, wherein the controller acquires dot data indicating to-be-formed ink dots corresponding to each of two images, performs forming of the first image by using the first image nozzle group based on the dot data for the image where the number of to-be-formed ink dots is larger, and performs forming of the second image by using the second image nozzle group based on the dot data for the image where the number of to-be-formed ink dots is smaller.

6. The printing apparatus according to claim 1, wherein the controller forms the second image by using the second image nozzle group and a nozzle group among the nozzles included in the first nozzle column, of which the position in the first direction is the same as that of the second image nozzle group.

7. The printing apparatus according to claim 1, wherein in the backward pass, the controller does not use any of the nozzles included in the first nozzle column to form the first image.

8. The printing apparatus according to claim 1, wherein the first image is formed only by the image forming operation in the forward pass, and the second image is formed by the image forming operation in the forward pass and in the backward pass.

9. The printing apparatus according to claim 1, wherein the second image nozzle group does not overlap the first image nozzle group with respect to the position in the first direction.

10. The printing apparatus according to claim 1, wherein a direction of the forward pass is opposite to a direction of the backward pass.

11. A method of controlling a printing apparatus having a first nozzle column configured with a plurality of nozzles aligned in a first direction, a second nozzle column configured with a plurality of nozzles aligned in the first direction, the second nozzle column corresponding to ink different from the ink corresponding to the first nozzle column, a moving mechanism relatively moving the first nozzle column and the second nozzle column in a second direction with respect to a printing medium, and a transporting mechanism relatively transporting the printing medium in the first direction with respect to the first nozzle column and the second nozzle column, the second direction intersecting the first direction, the method comprising:
a process of forming an image on the printing medium by repeating an image forming operation of allowing the first nozzle column and the second nozzle column to eject ink and a transporting operation of allowing the printing medium to be transported,
wherein the image forming operation includes the image forming operation of allowing the first nozzle column and the second nozzle column to be moved in a forward pass in the second direction and the image forming operation of allowing the first nozzle column and the second nozzle column to be moved in a backward pass in the second direction,
wherein, in the process, a first image is formed by the image forming operation in the forward pass by using a first image nozzle group included in the first nozzle column, wherein in the backward pass, the first image is not formed using the first image nozzle group included in the first nozzle column, and a second image is formed by the image forming operation in the forward pass and the image forming operation in the backward pass by using a second image nozzle group included in the second nozzle column, wherein the second image nozzle group is different from the first image nozzle group with respect to the position in the first direction, and wherein at least a portion of the second image is overlapped with the first image on the printing medium.

12. A non-transitory computer program for controlling a printing apparatus having a first nozzle column configured with a plurality of nozzles aligned in a first direction, a second nozzle column configured with a plurality of nozzles aligned in the first direction, the second nozzle column corresponding to ink different from the ink corresponding to the first nozzle column, a moving mechanism relatively moving the first nozzle column and the second nozzle column in the second direction with respect to a printing medium, and a transporting mechanism relatively transporting the printing medium in the first direction with respect to the first nozzle column and the second nozzle column, the second direction intersecting the first direction, the computer program storing the computer program for causing the printing apparatus to execute a function of forming an image on the printing medium by repeating an image forming operation of allowing the first nozzle column and the second nozzle column eject ink and a transporting operation of allowing transporting mechanism to transport the printing medium, wherein the image forming operation includes the image forming operation of allowing the first nozzle column and the second nozzle column to be moved in a forward pass in the second direction and the image forming operation of allowing the first nozzle column and the second nozzle column to be moved in a backward pass in the second direction, wherein, by the function, a first image is formed by the image forming operation in the forward pass by using a first image nozzle group included in the first nozzle column, wherein in the backward pass, the first image is not formed using the first image nozzle group included in the first nozzle column, and a second image is formed by the image forming operation in the forward pass and the image forming operation in the backward pass by using a second image nozzle group included in the second nozzle column, wherein the second image nozzle group is different from the first image nozzle group with respect to the position in the first direction, and wherein at least a portion of the second image is overlapped with the first image on the printing medium.

* * * * *